United States Patent [19]

Nersesian

[11] Patent Number: 5,709,142

[45] Date of Patent: *Jan. 20, 1998

[54] COOKING OVEN AND METHOD

[76] Inventor: John Nersesian, 1930 Ferry Park, Detroit, Mich. 48208

[*] Notice: The term of this patent shall not extend beyond the expiration date of Pat. No. 5,377,582.

[21] Appl. No.: 579,790

[22] Filed: Dec. 28, 1995

Related U.S. Application Data

[62] Division of Ser. No. 275,103, Jul. 14, 1994, Pat. No. 5,490,451, which is a division of Ser. No. 36,342, Mar. 24, 1993, Pat. No. 5,377,582.

[51] Int. Cl.⁶ ........................................ A47J 37/04
[52] U.S. Cl. .................. 99/420; 99/386; 99/443 C; 99/341; 99/448
[58] Field of Search .................. 99/420, 341, 446, 99/448, 443 C, 419, 477–479, 427, 386, 389; 426/243, 523

[56] References Cited

U.S. PATENT DOCUMENTS

| | | | |
|---|---|---|---|
| 1,638,452 | 8/1927 | Panajiotaros et al. | 99/420 |
| 2,333,175 | 11/1943 | Henley | 99/420 |
| 2,728,286 | 12/1955 | Ehrenberg | 99/386 |
| 3,003,409 | 10/1961 | Mills | 99/420 |
| 3,563,160 | 2/1971 | Otsuka | 99/345 |
| 4,176,592 | 12/1979 | Doyle, Jr. | 99/419 |
| 4,366,182 | 12/1982 | Kohler et al. | 99/420 X |
| 4,401,018 | 8/1983 | Berry | 99/420 |
| 4,590,848 | 5/1986 | Willingham | 99/339 |
| 4,753,216 | 6/1988 | Nolte | 99/389 X |
| 5,006,355 | 4/1991 | Stuck et al. | 99/386 X |
| 5,193,443 | 3/1993 | Carney | 99/419 |
| 5,271,316 | 12/1993 | Wisting | 99/420 |

*Primary Examiner*—David Scherbel
*Assistant Examiner*—Patrick F. Brinson
*Attorney, Agent, or Firm*—Barnes, Kisselle, Raisch, Choate, Whittemore & Hulbert, P.C.

[57] ABSTRACT

A cooking oven and method of cooking vertically arrayed food carrying skewers movably attached and carried in a horizontal endless travel path by conveyor means to encircle a heating element array within a single open cooking oven chamber so as to constantly directly and indirectly expose the food to the heat radiated from the element array throughout the complete travel path within the oven chamber. A plurality of internested drip pans are disposed within the oven chamber vertically beneath the food travel path for collecting juice drippage. The oven chamber superposed beneath a conveyor chamber contains an alternating array of infrared gas burners and reflectors arranged upright in a row. A slot communicating between the conveyor chamber and oven chamber provides for travel of suspended food carrying skewers within the oven chamber and incorporates a gasket seal to retain heat and inhibit transfer of contaminants downwardly to the oven chamber. Each skewer provides a stripper disk for facilitating unloading of food products and a retention clip for retaining food products vertically arrayed on each skewer. The oven has loading and unloading station doors at opposite sides and access doors at its ends to facilitate cooking and cleaning. The method of cooking shish kebobs or food carrying skewers allows for arranging food products selectively in a vertical array to obtain desired juice drippage between suspended food products to achieve a desired predetermined basting and seasoning therebetween.

16 Claims, 7 Drawing Sheets

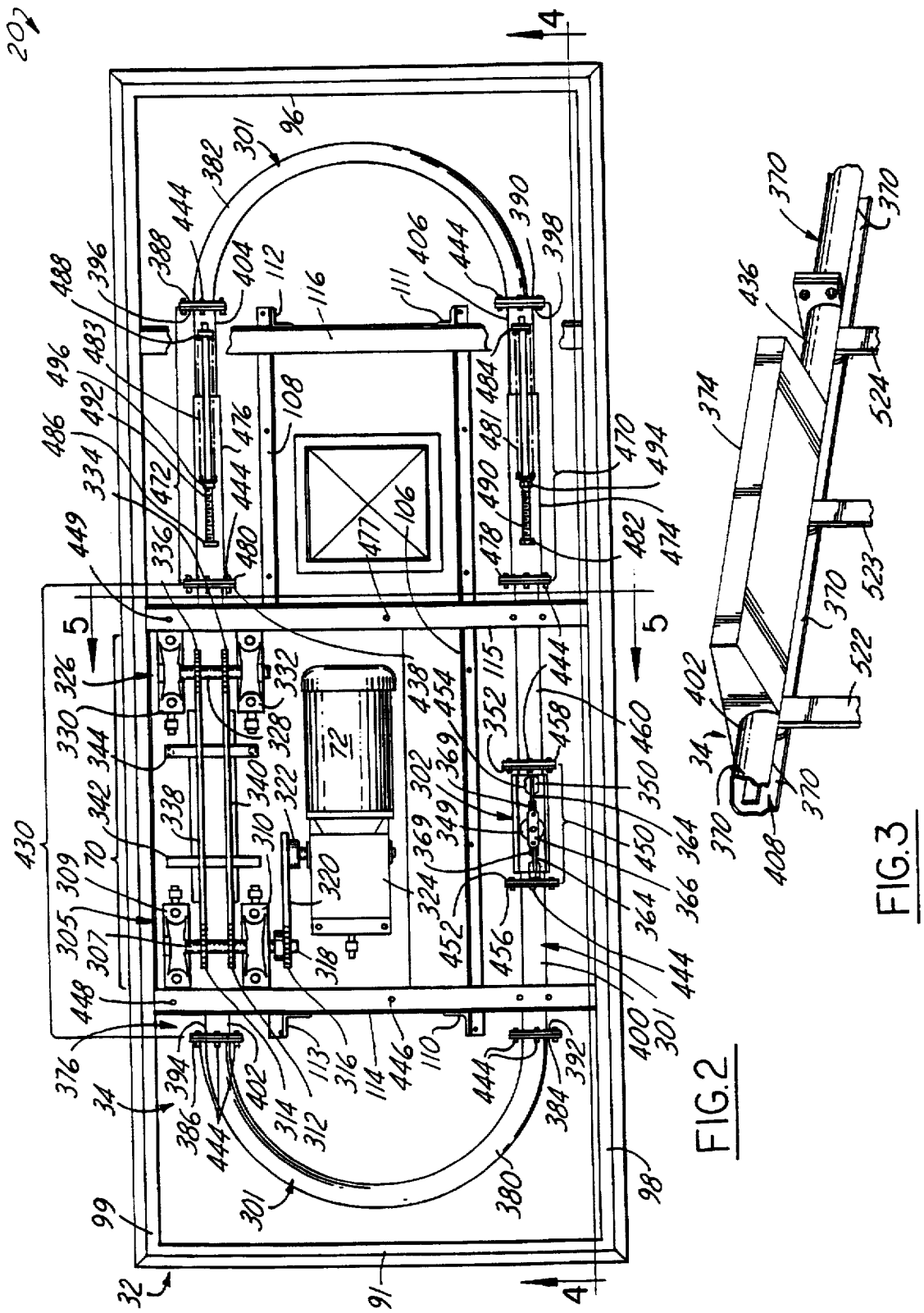

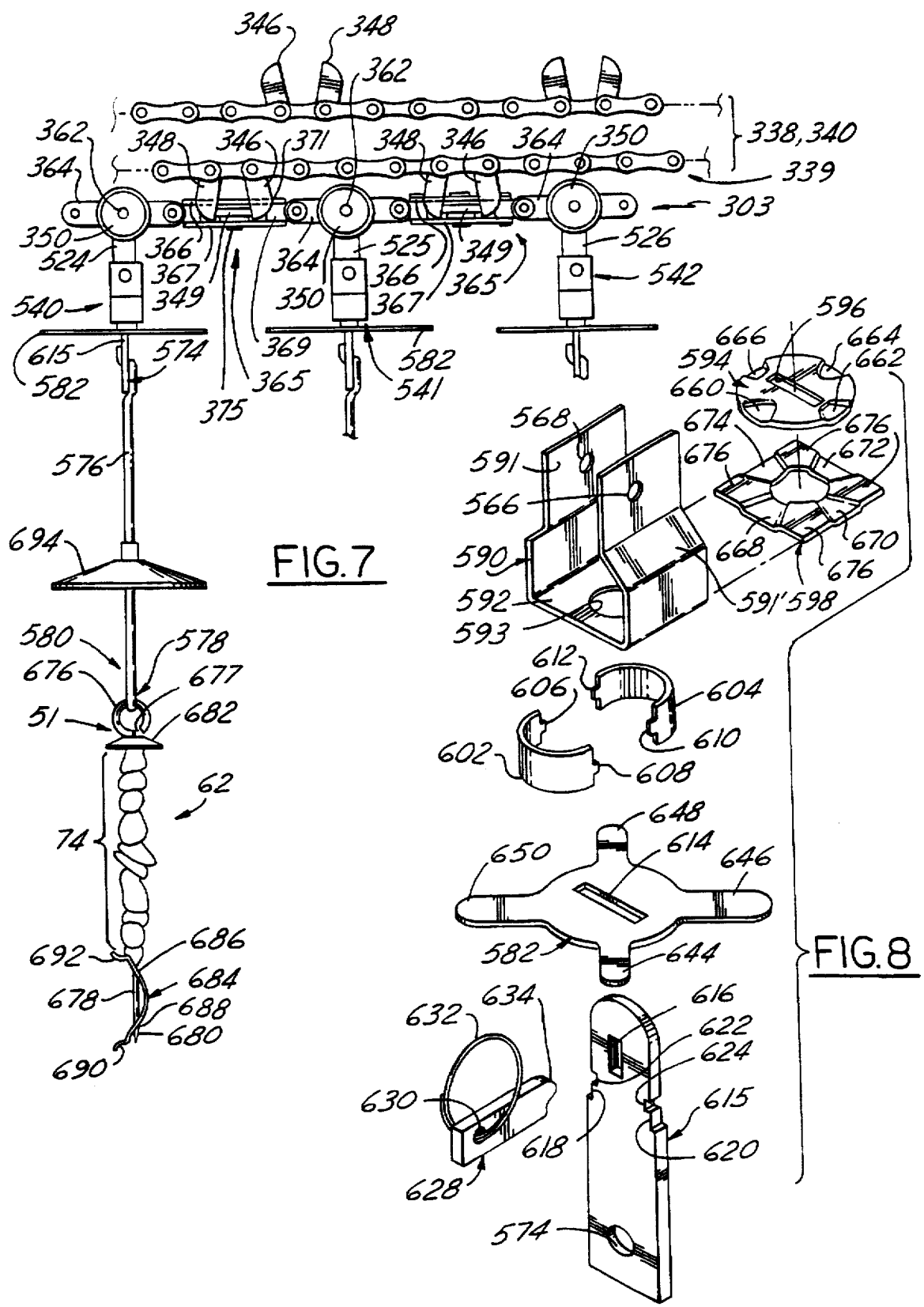

5,709,142

1
COOKING OVEN AND METHOD

This application is a divison of Ser. No. 08/275,103 filed Jul. 14, 1994 now U.S. Pat. No. 5,490,451 which is a division of Ser. No. 08/036,342 filed Mar. 24, 1993, now U.S. Pat. No. 5,377,582.

FIELD OF THE INVENTION

This invention relates to cooking ovens, and more particularly to an apparatus and method for vertically cooking shish kebobs carried through an oven chamber.

BACKGROUND OF THE INVENTION

In the automated cooking of food products, it is known to rotate the food being cooked in an oven as it is carried on hangers along an oven path by an endless conveyor past heating elements. A previously known apparatus for achieving this result was disclosed by Hemley in U.S. Pat. No. 2,333,175. It is also known to mount food on a spit carried by a holding arm on an endless carrier in a continuous fashion between infra-red radiant gas heaters as disclosed by Otsuka in U.S. Pat. No. 3,563,160. Otsuka discloses a device for cooking spit carried food and it achieves the result by intermittently exposing the food to an uncovered heater while carrying it over a travel path. However, Otsuka does not provide an oven chamber for cooking the food. Neither of the preceding devices teach a method of constantly directly exposing food in a single open cooking oven chamber to a central heating element array in order to broil the food. Additionally, neither device monitors the doneness of food being cooked, and neither allows for preselected arrangement of food products to achieve desired seasoning between food products from juice drippage vertically descending on vertically arrayed food products.

Additional prior art patents of general interest are U.S. Pat. Nos.: 1,638,452; 2,728,286; 3,003,409; 4,366,182 and 4,401,018.

An object of the present invention is to provide an improved apparatus and method for efficiently cooking vertically suspended food products on a skewer. Another object is to provide an oven of the above character in a single open cooking oven chamber with a centrally arranged heating element array therein and wherein food is cooked while traveling in an endless horizontal path encircling such array while constantly directly and indirectly exposing such food products to radiant and convection heat generated by such array throughout the entire travel path therein. An additional object is to provide for monitoring of food products carried on a particular skewer in the oven and enable easy determination of done-ness of such particular products as a function of oven travel time. Still another object is to facilitate cooking of shish kebobs in a manner suited for a fast-food-type continuous cooking operation, and to enable a preselected drippage of juices from the cooking process to cause automatic basting of flavors and spices between particular food products. Further objects are to provide in an oven and method of the aforesaid character inexpensive drip collection means oriented and arranged to facilitate fast and easy clean-up of juice drippage from the cooking process, as well as fully effective containment of juices therefrom to provide for a cleaner cooking operation, and contribute to a substantially smokeless mode of cooking of food products within the oven.

BRIEF DESCRIPTION OF THE DRAWINGS

Presently preferred embodiments of the invention, together with additional objects, features and advantages thereof, are set forth in the following detailed description, the appended claims and illustrated in the accompanying drawings (which are scaled from engineering drawings unless otherwise indicated) in which:

FIG. 2 is a top plan view of the cooking oven shown in FIG. 1.

FIG. 3 is a fragmentary perspective view showing the conveyor drive trough, and a portion of the adjoining conveyor system.

FIG. 7 is a fragmentary elevational view of a portion of the conveyor chain, the conveyor drive chain, a conveyor carrier and a shish kebob skewer removably suspended on a rod hanger of a conveyor carrier.

FIG. 8 is an exploded perspective view of a conveyor carrier as shown in FIGS. 4, 5 and 7.

DETAILED DESCRIPTION OF THE PREFERRED EMBODIMENT

Overview of the Preferred Embodiment

Figure 1:
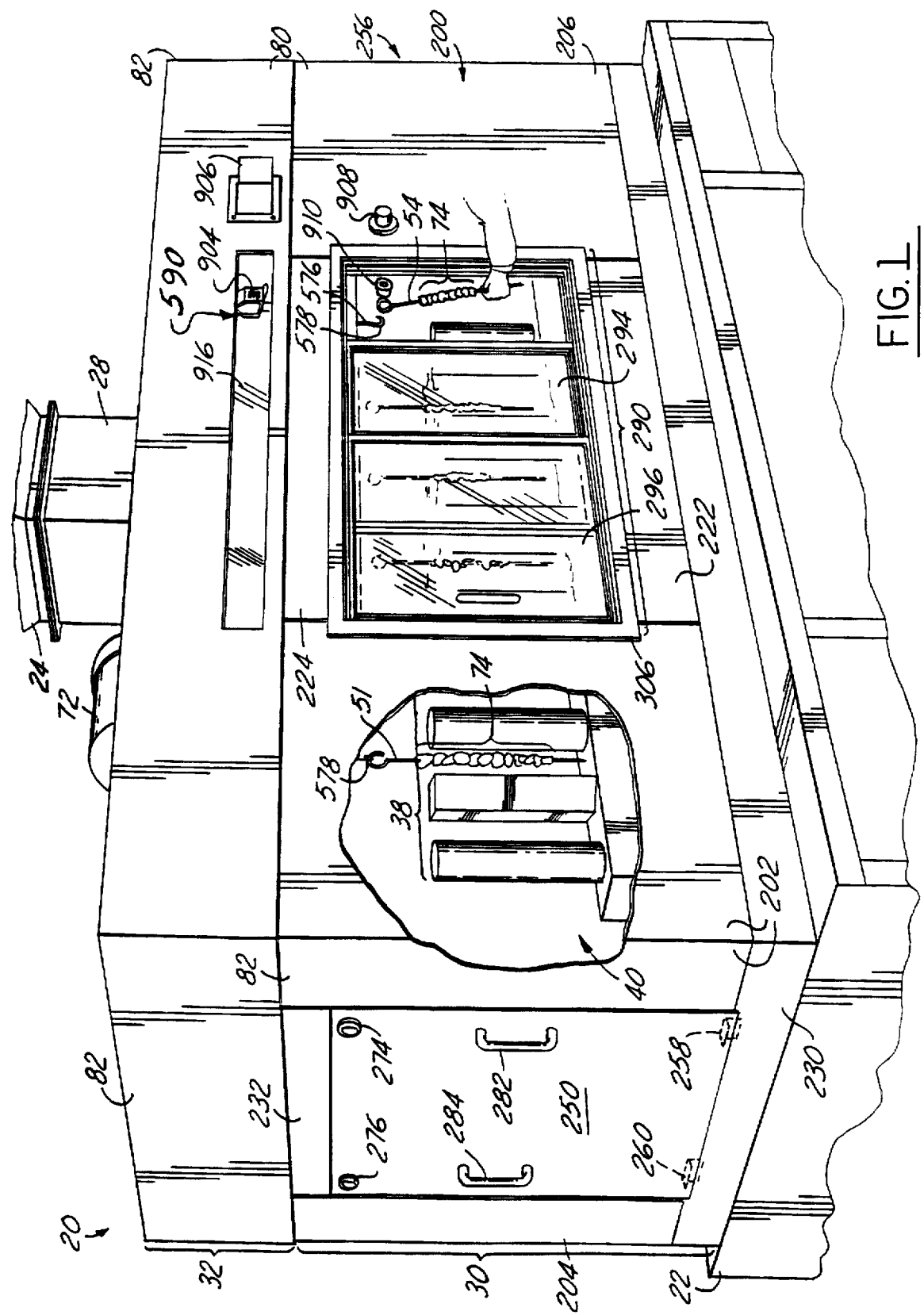
FIG. 1 is a perspective view of a preferred embodiment of the cooking oven of the present invention, with associated support stand and exhaust canopy shown fragmentarily.

Referring to the drawings, a cooking oven constructed in accordance with the present invention is generally designated by the numeral 20 in FIGS. 1, 2 and 4–6. In FIG. 1, the cooking oven 20 is shown mounted on a stand 22 and attached to an exhaust canopy 24 carrying conventional exhaust filter equipment therein (not shown) to exhaust the oven cooking chamber through its exhaust tube 28. The exhaust canopy, exhaust filter equipment and stand form no part of the present invention per se and accordingly will not be described in detail.

Referring generally to FIGS. 1–5, the cooking oven 20 includes an oven section 30 with a conveyor section 32 superimposed thereon and attached thereto. A conveyor system 34 (FIG. 4) is housed within conveyor section 32 and provides for transportation of food while being cooked therebeneath in oven 20 and carries such food in a horizontal elliptical loop travel path 36 entirely contained within the interior of oven 20, as depicted in FIG. 6. A heating element array 38 is arranged in a row centrally of an oven cooking chamber 40 and is encircled by the food travel path 36. Oven 20 is constructed such that oven cooking chamber 40 is a single open space contained therein. The conveyor system 34 carries a plurality of food skewers 51–68 in horizontally spaced relation which are individually removably attached and hung vertically from the conveyor system with the skewers being constantly directly exposed to the heating element array 38 throughout their travel in the horizontal path 36, thereby forming a complete heating and cooking cycle around array 38 within oven cooking chamber 40. A conveyor drive system 70 (FIG. 2), driven by a variable speed electric motor 72, provides locomotion to the conveyor system 34 and food products 74 carried thereby. An array of internested removable drip pans 800–817 (FIGS. 4–6) is disposed within the oven chamber 40 and positioned beneath the path of travel of the food products 74 carried by and hung beneath the conveyor on skewers 51–68, so as to provide for collection of drippage resulting from the food cooking process.

Oven Body

Figure 4:
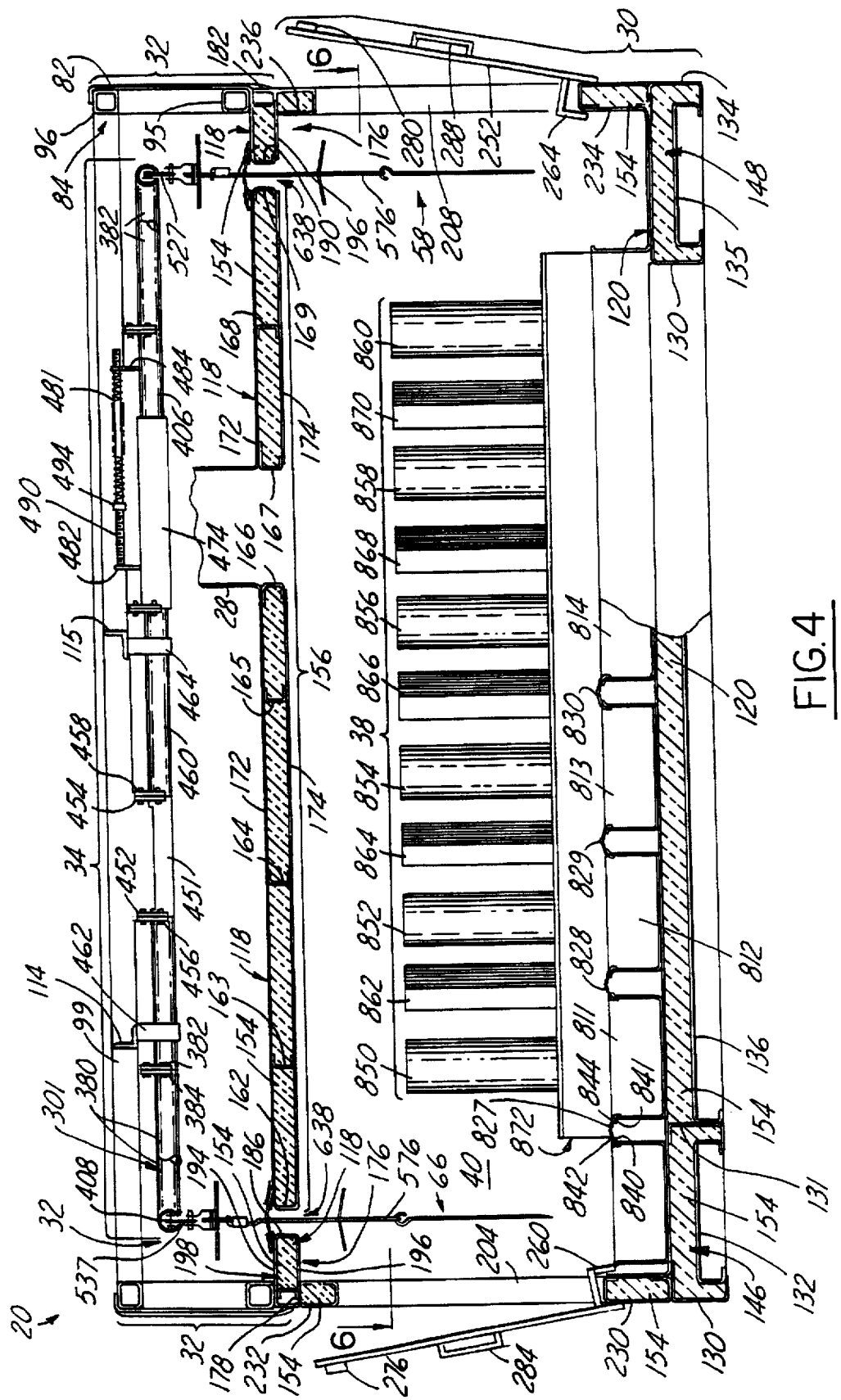
FIG. 4 is a vertical cross-sectional view taken generally on the line 4—4 of FIG. 2 with selected portions broken away at the oven centerline and illustrated in elevation for clarity.
Figure 5:
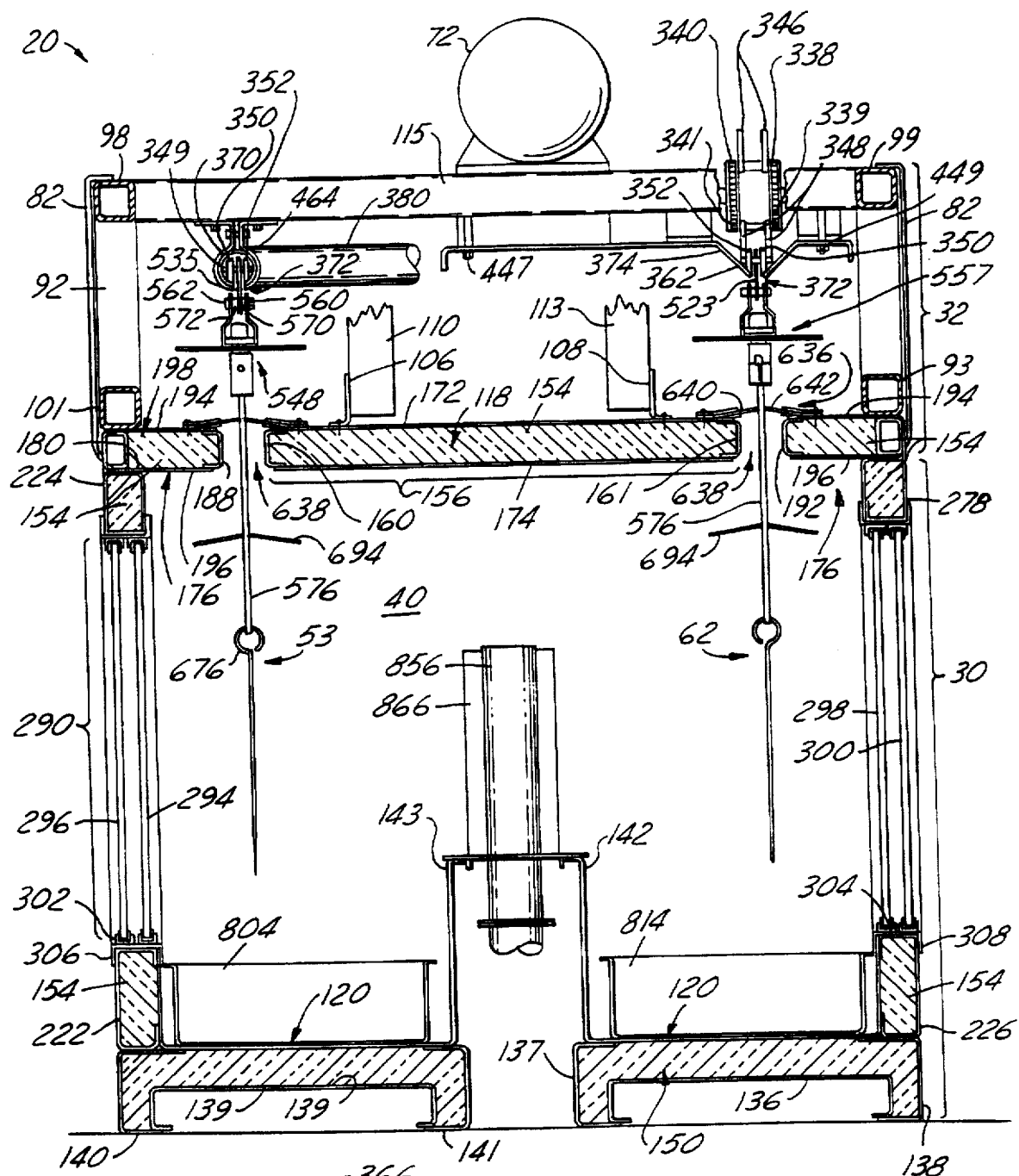
FIG. 5 is a vertical cross-sectional view taken on the line 5—5 of FIG. 2.
Figure 5A:
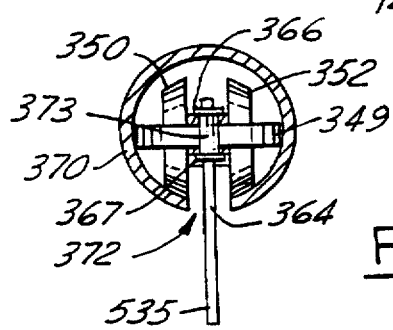
FIG. 5A is a vertical cross-sectional fragmentary view showing a conveyor track and chain in cross-section, and enlarged and taken from FIG. 5.
Figure 6:
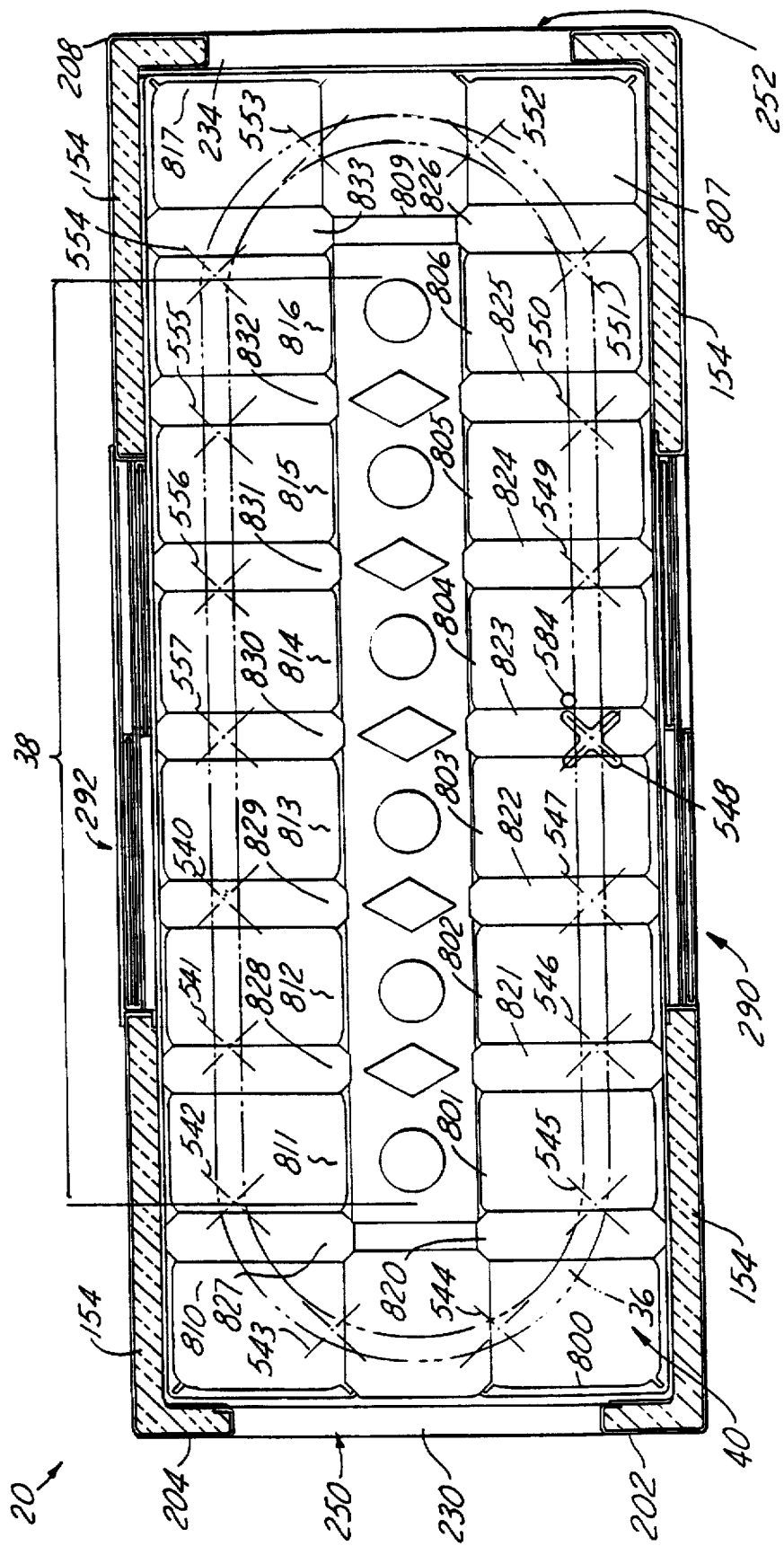
FIG. 6 is a horizontal cross-sectional view taken on the line 6—6 of FIG. 4.

Referring in more detail to FIGS. 1, 2, 4 and 5, the exterior portion of the cooking oven 20 as formed by the conveyor section 32 and oven section 30 forms a rectangular box-like cooking oven shell 80 (FIG. 1). The shell about the conveyor section 32 is constructed from an outer skin of stainless steel sheet metal panels 82 attached to an exterior periphery of a tubular framework 84 constructed from tubular members 90–105 to form the conveyor section framework (FIGS. 4 and 5). Preferably, the skin is welded to the frame. Alternatively, mechanical fasteners can be substituted therefor. Additionally, roof frame members 106, 108 (FIGS. 2 and 5) carried by and suspended from vertical members 110–113 (FIGS. 2 and 5) and cross-members 114–116 (FIGS. 2 and 5) affixed to the conveyor chamber frame structurally support an oven chamber roof 118 (FIGS. 4 and 5).

An oven chamber floor 120 (FIGS. 4 and 5) is formed by joining pairs of open channel section members 130–143 together to form a pair of end-arranged transverse closed section members 146, 148 and a pair of longitudinal closed section members 150, 152 extending therebetween, each receiving insulation 154 therein to provide for an insulated oven chamber floor.

Likewise, the oven chamber roof 118 (FIGS. 4 and 5) comprises a suspended central portion 156 formed from a series of channel members 160–171 received between and affixed to a pair of generally parallel stainless steel sheet metal panels 172, 174 to provide for a multiple chambered enclosed interior for receiving insulation 154 therein. The periphery 176 of roof 118 is formed from a series of tubular framework members 178–184 constructed and arranged to span the periphery of the base of the conveyor section, being attached thereto and carrying the conveyor section sheet metal panels 82 thereabout. Each tubular framework member 178–184 joins to a corresponding inwardly disposed open channel member 186–192 with a pair of sheet metal faces 194, 196 so as to form at least one hollow portion 198 therein. Each hollow portion receives insulation 154 therein to provide for insulation of the peripheral portion of the oven chamber roof 118.

The vertical four-sided rectangular shell 200 about the oven section 30 is constructed from double walled panels 202–208 (FIGS. 1 and 6), such as formed by bending and welding stainless steel sheet metal, having a space therebetween for receiving insulation 154 therein, as well as further structural hollow framework members 222–236 (FIGS. 1, 4 and 5) forming the oven chamber sidewalls about the loading and unloading stations and the access doors (described hereinafter), each receiving insulation therein. The cross members 114–116 (FIGS. 2–4) in the conveyor chamber further provide for mounting of the conveyor system thereto.

Cabinet Access Doors

As depicted in FIGS. 1,4 and 6, a pair of cabinet access doors 250, 252 are provided for releasable, lift-away attachment to respective opposite ends 254, 256 of the oven section 30. A pair of angle brackets 258, 260 and 262, 264 carried at the base of each door, respectively, form a receiving groove 266, 268 between each bracket and the bottom lip 270, 272 of each door to receive each horizontal base members 230, 234 of each oven chamber end therein, respectively. Releasable attachment of the upper portion of each door to each oven section end is further provided by a pair of magnets 274, 276 and 278, 280 carried adjacent the top edge of each door, respectively, for releasable magnetic attachment to an udder cross member 232, 236 of the oven chamber shell 200 on each oven chamber end, respectively. A pair of handles 282, 284 and 286, 288 affixed to the exterior of each door, respectively, facilitates insertion and removal thereof.

Load/Unload Stations

As shown in FIGS. 1, 5 and 6, oven section 30 is provided centrally in its laterally opposite sides with a loading station 290 on one side and laterally opposed unloading station 292 in its other side, each constructed from a pair of sliding glass access doors 294, 296 and 298, 300 respectively. Each door is received in a complementary grooved frame, or raceway, 302, 304, respectively, having adjacent parallel tracks formed therein each receiving one of the pair of doors, with the frame extending about the periphery 306, 308 of the loading and unloading stations and affixed to the oven chamber shell 200. Each door and track is disposed in parallel relationship with the adjoining door and track, and each door spans slightly more than half the side wall window opening so as to provide for mutually overlapping sliding motion therealong to open either or both ends of the window opening in varying amounts as desired, while still providing for sealable engagement therebetween as each door is brought to its fully spread apart closed position. As viewed in FIG. 1, a loading station is shown with the right hand door 296 in a partially open position to provide access to shish kebob skewers 51–68 within the oven chamber. As depicted, the pair of left and right access doors 294, 296 are partially overlapped and the left hand door is in its closed position. Construction of these doors from a heat-resistant transparent glass material provides for easy viewing and monitoring of food products as they are carried and being cooked within the oven chamber 40.

Conveyor System

As seen in FIGS. 2–5, a tubular conveyor track 301 is carried within the conveyor section 32 and is driven by the conveyor drive 70 which imparts motion to a conveyor chain 303 carried within the conveyor track. Preferably, the sections of conveyor track, conveyor chain and conveyor driv are known components such as those commercially ava. able from Pacline Corporation, Missassauga, Ontario. As best shown in FIG. 2, the conveyor drive includes a first e unit 305 with an end shaft 307 journalled in a pair of pill blocks 309, 310, and carrying a pair of drive sprockets 3 2, 314 disposed between blocks 309, 310 and being fixed ad rotatably driven by shaft 307. A chain drive sprocket 31 is carried on one end portion 318 of shaft 307 which ext ds beyond the pillow block 310. A chain 320 is trained at one end over sprocket 316 and at its other end over an output sprocket 322 of a gear reduction drive unit 324 which in turn is driven by variable speed electric motor 72.

The second end unit 326 of conveyor drive 70 includes an idler shaft 328 journalled in a pair of pillow blocks 330, 332 and carrying a pair of idler sprockets 334, 336 disposed between the pillow blocks. A pair of conveyor drive chains 338, 340 extend between and are trained at their en s over drive sprockets 312, 314 and idler sprockets 3? 336, respectively. A pair of drive chain supports 342, 344 are disposed in spaced relation between the first and second end units so as to extend beneath the top run of each conveyor drive chain to provide a slide support for the top runs.

As depicted in FIG. 7, and partially in FIG. 5, each conveyor drive chain 338, 340 carries, at equally spaced intervals therealong, an array of tandem pairs of drive dogs 346, 348 positioned therealong for paired embracing and interdigitating driving engagement with a given one of a train of horizontal conveyor chain bearing wheels 349 as the same is carried along the conveyor chain track 301 closely beneath the associated bottom runs 339 and 341 of chains 338 and 340. A laterally arrayed pair of wheels 350 and 352 are mounted on an axle 362 passing through the first link 364 of a pair of alternating links forming conveyor chain 303. Conveyor track 301 comprises a tubular raceway 370 (FIG. 5) with a longitudinal slot 372 on the bottom, the wheels of each pair straddling the slot. At the conveyor drive station 70, the conveyor track 301 changes from tubular raceway 370 to a conveyor drive trough 374, as depicted in FIGS. 3 and 5. Trough 374 is open from above to provide access to the conveyor chain 303 for the chain driving engagement of drive dogs 346, 348 with respectively associated horizontal bearing wheels 349. Slot 372 continues on through trough 374 as the wheels are centered in straddled relation over slot 374 by the equally inclined sidewalls of trough 374.

Referring in more detail to FIGS. 2, 4 and 5, the tubular conveyor track 301 includes a pair of U-shaped end runs 380, 382, each having a pair of flanged end portions 384, 386 and 388, 390, respectively, for removable connection with fasteners to a pair of complementary flanges 392, 394 and 396, 398 carried by a pair of straight tubular track runs 400, 402 and 404, 406, respectively, so as to provide for an elliptical continuous raceway 408 therethrough.

A drive-communicating straight run assembly 430 (FIG. 2) is provided, including the conveyor drive trough 374 (FIG. 3) connected between straight run portion 402 and an additional straight run portion 436 affixed thereto and extending therefrom. Run 436 has a flange 438 fixed to a flange 480 by fasteners 444 as depicted in FIGS. 2 and 3. Drive trough 374 is suspended beneath and affixed to cross members 114, 115 in the conveyor chamber roof by shoulder bolts 446–449 extending downwardly therefrom. Trough 374 thus provides an upwardly open section in track 301 to enable coupling between the conveyor drive chains 338, 340 and the conveyor chain 303, and trough 374 also provides for additional access and servicing to such chains.

Likewise, a service opening straight run portion 450 (FIG. 2) provides another access opening for servicing conveyor chain 303. Run 450 includes a tubular U-section 451 having bottom slot 372 and open at the top and attached by a pair of end flanges 452, 454 to a flange 456 carried by straight run 400 and to a flange 458 carried by straight run portion 460. The service run 450 and adjoining closed straight run portions 400, 460 are jointly suspended beneath and affixed to cross-members 114, 115 by conveyor track hangers 462, 464 (FIG. 4), respectively.

Chain tensioning means are provided by a pair of straight run chain tensioning assemblies 470 and 472. Chain tensioning assemblies 470 and 472 respectively include a tubular straight run portion 474 and 476 with respective flanges 478, 480 at one end of each portion 474 and 476 for attachment to the respectively adjoining straight run portion 460, 436. Each of the tubular run portions 474, 476 has an inside diameter dimensioned to slidably telescopically receive in the open ends thereof the open ends of associated straight run portions 406, 404. Both pairs of telescoped runs 474, 406 and 476, 404 are yieldably forced in the direction of track elongation by coaction of an associated compression spring 481, 483. Runs 474 and 476 each have brackets 482 and 486 respectively affixed thereto, and likewise runs 404 and 406 each have brackets 484 and 488 affixed thereto. Bracket pairs 474, 476 and 482, 486 respectively support a threaded rod 490 and 492 affixed at one end to brackets 482, 486. The other end of each rod 490, 492 is slidable through associated brackets 484, 488. Springs 481 and 483 are sleeved on rods 490 and 492 respectively and butt at one end against brackets 484 and 488 respectively. The other end of springs 481 and 483 respectively abut against adjustment nuts 494 and 496 threadably received on the associated rod. Adjustment of nuts 494 and 496 along their associated rods provides for adjustment of resulting compression forces of the springs 481 and 483 coacting between the nuts 494, 496 and brackets 484, 488 and hence tending to force track end section 382 toward the right as viewed in FIG. 2, thereby tending to elongate the conveyor track 301. These track elongating forces in turn are resisted by conveyor chain 303 captured within the tubular conveyor track 301, and hence maintain tension in chain 303.

Conveyor Hangers

Referring in more details to FIGS. 2, 3, 5 and 5A, a conveyor pendant 522–539 is provided on one of a pair of alternating links forming conveyor chain 303, namely T-link 364. Each pendant is formed from a downwardly extending portion of each T-link so as to extend through slot 372. A shackle 369 is carried adjacent each of a pair of ends of each T-link with a rivet 371 so as to provide rotation in the vertical plane between the T-link and shackle. A pair of spaced link plates 366, 367 form a tandem link 365 between each T-link. Each end of each tandem link is affixed through each shackle by a pin 373. Each tandem link further carries a horizontal bearing wheel 349 between link plates 366, 367, and is carried for rotation on a roller pin 375 fixed between each link plate.

Conveyor chain 303 is formed by an alternating array of T-links 364 and tandem links 365. Chain 303 flexes in a horizontal plane via relative motion between each tandem link 365 and shackle 369 through pin 373. Additionally, chain 303 flexes in the vertical plane via motion between each shackle 369 and T-link 364 through rotation of rivet 371 in T-link 364. Each T-link further carries one pair of laterally arrayed wheels 350, 352 generally above each pendant 522–539 and mounted on axle 362.

Conveyor Carrier

Figure 9:
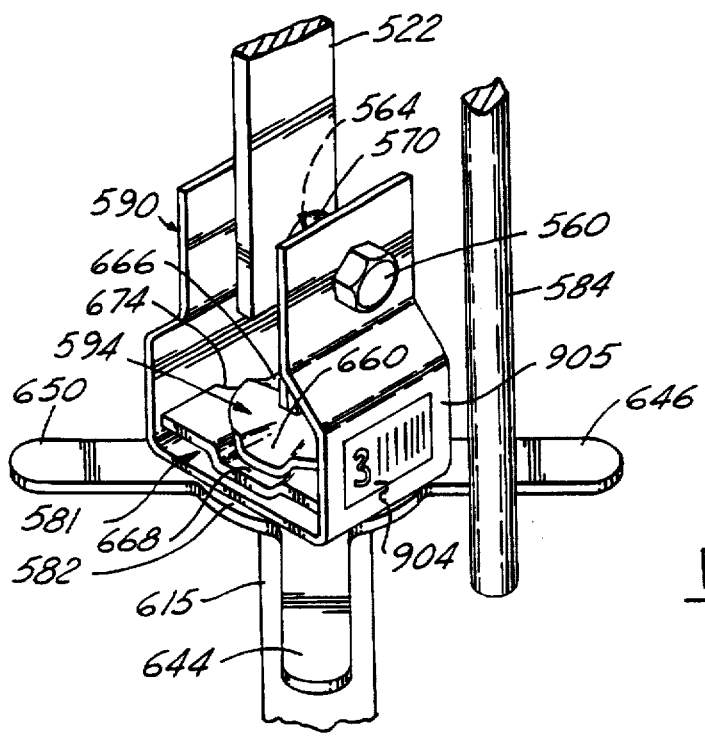
FIG. 9 is a fragmentary perspective view of a conveyor carrier operably engaged with a fixed rod abutment for imparting rotation thereto.
Figure 10:
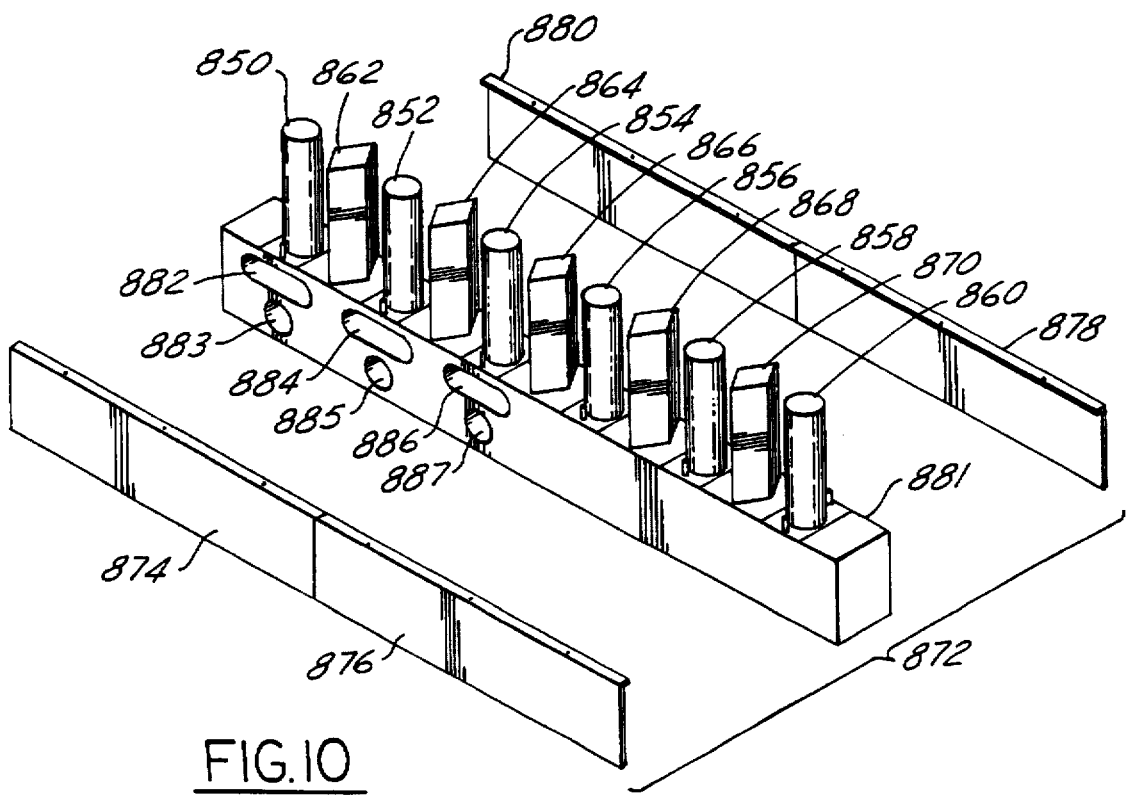
FIG. 10 is a partially exploded perspective view of the array of burners and reflectors as carried by a central platform and utilized in the oven depicted in FIGS. 1–6.

As best seen in FIGS. 7, 8 and 9, a plurality of conveyor carrier assemblies 540–557 are individually affixed one to each of the conveyor pendants 522–539 by a bolt 560 and nut 562. Bolt 560 is received through complementary strap hole 564 and carrier holes 566 and 568. A pair of spacers 570, 572 are sleeved on bolt 560 and interposed one on each side of pendant 522. Each carrier assembly 540–557 provides at its lower end a receiving hole 574 (FIG. 8) for removably receiving and engaging the upper end of a carrier hanger rod 576 (FIG. 7) constructed from a wire or the like. Hanger rod 576 has a hook 578 at its lower end 580 upon which is removably suspended a shish kebob skewer 51–68 carrying food products 74 thereon for cooking within oven chamber 40 (FIG. 7).

In order to provide uniform cooking of food products 74 carried on each shish kebob skewer 51–68 by conveyor system 34 about the interior of oven chamber 40, each conveyor carrier assembly 540–557 controllably and intermittently rotates its associated hanger rod 576 and suspended skewer through 90° increments about a vertical axis of rotation as the carrier and skewer travel horizontally along conveyor path 36. Each conveyor carrier assembly 540–557 provides such quarter-turn incremental rotation via a gravity biased detent mechanism 581 (FIG. 9) rotatably actuated by a star wheel disc 582 when impinging against fixed abutments 584–594 prepositioned along the carrier travel path, such as depicted by rod 584 in FIG. 9.

More particularly, each conveyor carrier assembly 540–557 has a U-shaped carrier body 590 (FIGS. 8 and 9) formed by a pair of spaced upright arms 591 and 591' formed at their lower ends by a flat web 592 having a journal opening 593 therein. A detent washer 594, having a washer keyway 596 is carried on a detent plate 598 having a journal opening 600. Both washer 594 and plate 598 are carried above and on web 592 of carrier body 590. Assembly 540 also includes a bearing sleeve made up of sleeve halves 602 and 604, each having a pair of tangs 606, 608 and 610, 612 extending from their respective ends. Bearing sleeve 602–604 is received through and journalled in the detent plate journal opening 600 and the carrier body journal opening 593. Star wheel disc 582 has a disc keyway 614 for receiving therethrough a carrier strap 615. Strap 615 has a carrier pin keyway 616, a pair of bearing sleeve shoulders 618, 620 in opposed relation, a pair of star wheel shoulders 622, 624 also in opposed relation. Strap 615 also has a hole 574 at its lower end for receiving the upper end of an associated carrier rod 576. Assembly 540 also includes a keyway pin 628 with a ring hole 630 receiving a retention snap ring 632 therethrough.

In assembly, the upper end of carrier strap 615 is inserted upwardly through star wheel keyway 614 until star wheel 582 rests on strap shoulders 618 and 620. The upper end of strap 615 is further inserted through body opening 593, plate opening 600 and disc keyway 596 with bearing sleeve 602–604 received thereabout. Strap 615 is journalled in body 580 by bearing sleeve 602–604 which is received in body journal opening 593 and in detent plate journal opening 600. The upper end of strap 615 is also inserted through detent washer keyway 596 so as to protrude above detent washer 594. Upon such assembly, keyway pin 628 is inserted through strap keyway 616 to retain the parts in assembled relation. Retention snap ring 632 is then pivoted over the upper end of strap 615 to capture pin 628 on strap 615. The snap ring is releasably locked in strap engagement by forcing ring 632 over a shoulder nose portion 634 of keyway pin 628 to thereby provide a releasable, snap-fastened, pinned retention of the assembled parts of carrier 540.

As depicted diagrammatically in FIG. 6, thirty two conveyor carriers 540–557 are carried by the conveyor chain in equidistant spaced relationship thereabout, preferably of center to center spacing of 6". Additionally, as depicted in FIGS. 4 and 5, each conveyor-suspended carrier hanger rod 576 extends vertically downwardly from the interior of the conveyor section 32 into oven chamber 40 for suspension of a skewer thereon for travel in chamber 40. To further retain heat within oven chamber 40 and prevent contaminants dropping from the conveyor from falling into oven chamber 40, a silicone gasket seal 636 is mounted atop oven chamber roof 118 and along the conveyor carrier rod travel path slot 638. Seal 636 comprises a series of opposed pairs of internesting flexible gasket sheets 640, 642, each fixed along one edge of the sheets on opposed sides of slot 638 in the oven chamber roof and overlapping slightly at their free edges. Motion of each carrier rod 576 locally displaces the yieldably overlapping free edges of the opposed pair of sheets immediately adjacent such rod as the carrier rod travels therealong, the gasket edges resuming overlapped relationship to provide substantially complete sealing of the slot after each rod passes by.

Additionally, a conically shaped dirt shield 694 (FIGS. 4, 5 and 7) is forcibly and frictionally carried one on each carrier hanger rod 576 so as to form a canopy generally vertically above the shish kebob skewer 51–68 carried therebelow so as to additionally shield the same from dirt and contaminants dropping from the conveyor system 34 and conveyor drive 70 thereabove.

As best seen in FIGS. 3–6 and 9, an array of fixed abutments 584–594 are placed in stationarily fixed equidistant spaced relationship about the travel path 36 of the carriers 540–557. Abutments 584–594 may be constructed from cylindrical rod stock and arranged to obstruct travel thereby of the outer end of the inwardly pointing one of the four arms 644–650 of each star wheel 582 of each carrier 540–557 as each is brought into impingement with each rod as the star wheels are carried about the path of travel 36 by conveyor 34. As the impinging one of the four arms 644–650 is restrained by a rod, forward motion of the associated star wheel 582 with its carrier imparts rotation to the star wheel about its vertically oriented axis of rotation. The gravity detent mechanism 581 of the carrier yields to such rod restraint to allow a 90° rotation of the star wheel 582, its associated detent washer 594 and carrier strap 615 to further impart a quarter-turn revolution to the carrier rod 576 and suspended shish kebob skewer 62 about the vertical axis of rotation of this entire suspended assembly. Thus, as each carrier 540–557 passes each fixed rod 584–594, the suspended skewer 62 and food products 74 carried thereon revolve 90° relative to carrier body 590 and conveyor chain link 522 connected thereto.

More particularly, and as best shown in FIGS. 8 and 9, the foregoing rotational operation of the conveyor carrier 540 to produce successive quarter-turn revolutions, a shish kebob skewer 62 suspended therebelow at regularly spaced intervals along travel path 36 is regulated and stabilized by operation of the gravity detent mechanism 581 through coaction between detent washer 594 and detent plate 598. The weight of a loaded shish kebob skewer 62 and hanger 576 is transferred through carrier strap 615 and brought to bear by pin 628 upon detent washer 594, which rotates with strap 615 relative to detent plate 598 and body 590. The combined weight of detent washer 594, bearing sleeve 602–604, star wheel 582, keyway pin 628, ring 632, carrier strap 615, carrier rod 576, and any suspended shish kebob skewer 62 and food products 74 imparts downward gravitational loading on detent washer 594 to forcibly engage it with detent plate 598. An array of four detent protrusions 660–666 disposed at 90° increments in detent washer 598 depressed downwardly from the principal plane of washer mate with four corresponding detent pockets 668–674 in detent plate 598. When the arrays of washer detents 660–666 are registered with plate detents 668–674, the washer 594 and plate 598 are closely nested in parallel relationship. As the array of washer detents 660–664 is rotated, when a rod 584–594 indexes the associated star wheel a quarter-turn, they are forced out of registration with the plate detents, thereby vertically lifting washer 594 an amount equal to the depth of each detent and causing the washer detents to ride upon the substantially planar portion 676 of the remaining top surface of detent plate 598. As the star wheel disc 582 completes its quarter-turn and is about to travel beyond the fixed abutment rod, washer detents 660–666 rotate to drop into indexed re-registry with detents 668–674 and thereby yieldably retain star wheel 582 in this quarter-turned indexed orientation until engagement along travel path 36 with the next successive abutment 584-594. As washer 594 is so re-registering detents with plate 598, washer 594 vertically drops as it nests on plate 598 by the depth of the detents. FIG. 9 depicts completion of such a cycle as detent washer 594 drops into a new nested arrangement with plate 598, this orientation being maintained by the gravitational vertical loading.

Shish Kebob Skewer Assembly

As depicted in FIGS. 4, 5 and 7, each shish kebob skewer 51-68 is formed from a piece of wire, preferably made of stainless steel and having a non-circular cross-section, having a looped eyelet upper end 676 having a parting gap 677 large enough for readily removable attachment on the end hook 578 of an associated carrier hanger rod 576. Each skewer also has a downwardly extending axial shaft 678 and a sharp tip 680 for through-piercing food products 74 as they are skewed onto the shaft. A conically shaped food stripper 682 is removably carried on skewer shaft 678 above the food products 74, and in proximal relation to skewer eyelet 676 for facilitating removal of food products 74 from the skewer after removal of the same from the oven with a load of the fully cooked food products 74 thereon.

A retaining clip 684 is removable affixed to the lower end of shaft 678 of each skewer for retaining a load of food products 74 on the skewer and to adjustably trap such food products between stripper 682 and the clip. Preferably, such clip is manually removed from skewer shaft 678 prior to stripping food products 74 off shaft 678 by moving stripper 682 along shaft 678 toward shaft end 680.

A retaining clip 684 is formed from a generally flat piece of flexible and springy material such as a strip of stainless steel spring metal and has a pair of spaced apertures 686 and 688 for receiving the skewer shaft 678 slidably therethrough with a close fit when the retainer clip is flexed into a bowed and stressed condition. After such insertion of skewer shaft 678 and upon release of the flexed clip 684 from the bowed and stressed condition, the clip 684 is restrained from returning to an unbowed free-state condition due to the small clearance between apertures 686, 688 with shaft 678. The spring force thus developed causes clip 684 to frictionally grip skewer shaft 678 to thereby yieldably restrain sliding movement of clip 684 along the skewer. Preferably, clip 684 additionally includes a pair of reversely bent finger-gripping tabs 690 and 692 integrally carried at opposite ends of clip 684. Tabs 690 and 692 are generally displaced from the plane of the strip and suitably curved to facilitate finger retention of the retaining clip with one hand and flexing and bowing of clip 684 for insertion and removal on the associated skewer 51-68.

Drip Pans

As depicted in FIGS. 4, 5 and 6, the internested drip pan array comprises an arrangement of individually removable drip pans 800-817 which are end lip-nested together by caps 820-833 carried over adjoining adjacent end lips, such as depicted by cap 827 over end lids 840 and 841 (FIG. 4), to direct juice drippage from the cooking process into each adjoining pan. Preferably, each cap is removably carried by the end lips of each pair of adjoining pans as depicted in FIG. 4, to facilitate removal and cleaning of the cap and pans, as well as to facilitate emptying of each pan prior to cleaning. Each cap 827 generally provides a pair of opposed inclined surfaces 842, 844 with a bridge 846 formed therebetween for directing drippage down one or both surfaces into an adjoining pan. Caps 820-833 and pans 800-817 provide complete horizontal coverage of the oven chamber floor beneath the carrier suspended shish kebob travel path 36 to catch drippage from cooking food products thereabove, caps 820-833 insuring that substantially all of such drippage is drained into the array of internested drip pans 800-817, as will be best seen in the plan view of FIG. 6.

Heating Element Array

Heating element array 38 is constructed and arranged single file vertically and centrally of oven chamber 40 and comprises a horizontal row of vertically oriented alternating burners 850-860 and reflectors 862-870. Preferably, infrared gas-fired burners such as provided by Solaronics, Inc., Model #5K402, are utilized. As depicted in FIGS. 4, 5, 6 and 10, six such burners 850-860 of cylindrical geometry are arranged with their axes vertical, with five columnar reflectors 862-870 individually interposed therebetween in an alternating array, the array being carried on a central burner platform 872. Reflectors 862-870 are preferably diamond-shaped in horizontal cross-section (FIG. 6) with their obtuse angle apices parallel to and aligned with the axes of burners 850-860. As shown in more detail in FIG. 10, removable side panels 874-880 attach in spaced relation to the sides of a box-like housing 881 which serves as the burner mounting base. Housing 881 has access slots 882-892 for conventionally fixing pipe unions to gas feed lines (not shown) to fire such burners. Preferably, reflectors 862 are constructed to optimize reflection of infra-red radiant energy emitted from an adjacent pair of flanking burners 850-860 into travel path 36. Additional secondary reflection into path 36 of such infrared radiation is provided by the stainless steel sheet metal 182 exposed on the inner surfaces of the oven chamber 40 such as is provided by panels 202-208 and oven roof skin 174.

As will be well understood by those skilled in the burner art, and as is conventional, the gas lines supply a premix combustion feed of natural gas and air which is controlled and regulated through a main gas regulator (not shown) and six individual manual safety shut-off gas cocks and solenoid valves (not shown). Likewise, a flame sensor rod (not shown) detects the presence of combustion therein while a combustion mixture is being fed to each burner, and provides for shut-off in the event of loss of flame. Further control system components operably connect and communicate with each burner to provide for control of system operation, such as is typically utilized for gas burners of this type. Each of the burners 850-860 may be individually controlled so that any one or more of the burners may be operated during a cooking operation.

Food Monitoring System

As depicted in FIGS. 1 and 9, a counter/identification mechanism monitors the loaded/unloaded status of each conveyor carrier 540-557 with respect to food product carrying skewers 51-68, and further monitors degree of done-ness of the food products 74 carried thereon. Additionally, incorporation of a conventional computerized monitoring system (not shown) allows for operator monitoring of types of food products carried on a specific skewer as well as variations in seasonings as applied thereon. The counter/identification mechanism comprises an identifying bar code and number tag 904 carried on a vertical face 905 of each carrier body 590 as depicted in FIG. 9, and a bar code scanner 906 mounted on the oven shell 80 and constructed and arranged to read each bar code as it travels in front of the scanner (FIG. 1). A photovoltaic eye 908, preferably placed just downstream of the loading station 290, is operable to detect a skewer-loaded carrier 540-557 by monitoring a light beam emitted from a light source 910 constructed and arranged so that the beam is interrupted by a skewer passing therebetween in a manner which causes the photovoltaic eye to trigger a reading. Bar code scanner 906 is then instructed to identify the loaded carrier, and the associated computer electronics system begins timing and tracking the status of the loaded carrier via the carrier's bar code. The system further provides output to a video display monitor (not shown) allowing an operator to visually track on the display the status of each carrier, particularly the identity of a particular skewer thereon and the time it has been carried in the oven i.e., its oven travel time. The operator at the unloading station 292 can determine the status of a particular carrier food product by viewing same on the monitor. Then by viewing through an observation window 916 provided one on each side of the conveyor cabinet above the load and unload stations, the unload operator can visually identify that particular product by the number on each carrier which corresponds with the status displayed on the monitor. Thus, the system enables an unskilled operator to selectively remove food-product-laden skewers from their associated carriers in accordance with the desired degree of done-ness without exercise of culinary judgment.

Operation and Method

In accordance with the preferred embodiment of the present invention, as depicted variously in FIGS. 1–10 and as hereinbefore described, the operation of such an oven 20 constructed in accordance with the present invention, and its use in practicing the method of the invention to prepare food products 74 such as shish kebobs or chickens for preparation and delivery in a fast food operation is hereinafter described. Before loading food product carrying skewers 51–68 into oven chamber 40, the oven operator turns on both the oven burners 850–860 and oven conveyor 34, including manually selecting an array of valves (not shown) to turn on a predetermined selection of burners within the heating element array 38. When conveyor motor 72 is started, motion is imparted through reduction drive 324 and chain drive 320 to conveyor drive 70 and drive chains 338, 340 therein, which in turn drive conveyor chain 303 so as to impart motion to each of the carriers 540–557 suspended therefrom to cause the associated hanger rod 576 affixed thereto to travel along path 36 in oven chamber 40. Preferably, the drive motion is continuous and at a constant velocity, such as about 8 feet per minute, so that cooking done-ness of the food product preloaded or the skewers on the conveyor is a direct function of oven travel time that is, as now will be readily understood by those skilled in the art from the foregoing, the read-out indication of extent of travel in the oven at constant velocity provides a direct, easily read conversion of extent of time of skewer-loaded product exposed to oven cooking energy and hence extent or degree of product cooking done-ness.

Either before or after start-up of the cooking oven 20, the operator or other food service personnel prepare an assortment of food-loaded shish kebob skewers 540–557 for later suspension and cooking in oven chamber 40. In this food preparation stage, a conical stripper 682 is first inserted about the skewer tip 680 and slid up skewer shaft 678 to abut skewer eyelet 676. A pre-arranged array of food products 74 are then impaled by the skewer tip and slid onto the skewer shaft, preferably in a predetermined arrangement which provides for desirable seasoning and juice drippage onto associated adjacent food products during the subsequent conveyor-hung cooking of this food product array. Finally, a retaining clip 684 is removably installed on the skewer shaft 678 to retain the food products thereon. To facilitate engagement of clip 684 on the skewer, the clip is gripped by the operator with opposed fingers squeezing a pair of finger-gripping ends 690, 692 so as to bow the body of the clip to align the pair of apertures 686, 688 therein to slidably receive the skewer shaft therethrough. Upon release of the finger-gripping ends, the clip tends to spring back into its unstressed condition. This spring force causes gripping engagement between the pair of apertures and the skewer shaft to thereby frictionally retain clip 684 from slipping along shaft 678 to thereby insure vertical retention of food products suspended by impalement thereon.

A loading operator, provided with a tray of prepared-food-carrying skewers 540–557, proceeds to the loading station 290 of the oven box 30 and, with door window 294, 296 opened to the desired extent, begins hanging food-carrying skewers on each next available empty carrier rod hook 578 passing thereby. To load a skewer, one of the sliding glass access doors 294, 296 at the loading station is slid open in its raceway 302 and the loading operator, gripping a food loaded skewer adjacent its lower end hangs the skewer upper end eyelet 676 on the visible carrier rod hook as the same is traveling across the access opening.

The unloaded carriers become available for loading of skewers thereon as each unloaded rod carrier hook is brought by the conveyor via path 36 back to the loading station. Additionally, the loading operator or an assistant can record specific characteristics of food products 74 carried on specific skewers (e.g., "chicken" vs. "shish kebob") by inputting same into a suitable conventional interactive computer (not shown) operably connected for monitoring and controlling of the scanner 906 and photovoltaic eye 908 as previously described above.

After the conveyor has been fully or partially loaded, in accordance with the current demand for the cooked food products, an unloading operator, stationed at the unloading station 292 removes fully cooked shish kebob skewers therefrom. To unload a food-laden skewer, one of the pair of sliding glass access doors 298, 300 at the unloading station 292 is slid open in its raceway 304. The unloading operator, viewing through the observation window 916 in the conveyor chamber, identifies the number corresponding with a particular bar code 904, as identified on the monitor, to determine done-ness of the food product carried thereon as a function of oven travel time, determines which skewer to remove therefrom, and reaches within the oven to grab the lower portion of the selected skewer and lifts the eyelet 686 off of the carrier rod hook 578 to remove the skewer from the oven. The unloading operator can be situated to receive orders from customers and to unload shish kebob skewers having the desired characteristics as ordered by a particular customer. For example, the unloading operator can retrieve a "well done" shish kebob for a customer by observing the video display monitor (not shown) for a carrier having a skewer which has been carried in the oven for a preselected period of oven travel time corresponding to that required to cook a shish kebob to such level.

Upon completion of the continuous loading, cooking and serving operation, e.g., at the close of business hours, the oven 20 may be shut down by first turning off the burners 850–860, and then turning off the conveyor system 34. Next, the exhaust hood and filter system is turned off. The collection of drippage from the cooking operation is then emptied from the oven by manually removing each end access door 250, 252 to provide access to the pans 800–817 positioned in the bottom of the oven chamber 40. Each drip cap 820–833 is removed from the closest pair of internested drip pans, and then the first drip pan is removed from the oven and its contents are emptied into a holding tank. Likewise, the next drip cad is removed from the next closest pair of internested drip pans and the closest pan is removed. The preceding is repeated until all pans and caps have been removed from the oven. To facilitate removal of the pans, the closest pan can be pulled towards the operator in a manner which pulls the whole array of drip pans slidably towards the operator through the interlocking coaction of the caps as carried over adjoining pans. Upon removal of all drip pans and drip caps, the aforementioned are washed and cleaned, and the interior of the oven is likewise washed and cleaned. Finally, the array of internested drip pans and caps are inserted in reverse order of their removal. To facilitate their insertion, the operator can gush the closest pan into the oven in a manner which abuts and pushes all preceding and adjoining pans in the same direction.

Cooking of shish kebobs with the apparatus and method of this invention provides for selective and controlled seasoning and basting of pre-arranged and selected associated food products carried in an array on each shish kebob skewer. Vertical cooking of a suspended array of food products provides opportunities for preselectively arranging various food products in an array which allows for juice drippage of products carried above and adjacent products to be seasoned by such juice drippage. Alternatively, pre-arrangement of food products producing juice drippage to hang beneath various other food products provides for segregation of such food products and prevents comingling of seasonings and juice between products. Traditional cooking of shish kebobs carried on skewers does not provide for an effective comingling of juice drippage in order to obtain a desirable seasoning and basting, especially between non-adjacent food products, as such traditional shish kebobs are generally cooked in a horizontal array beneath a broiler or on top of a grill. Seasonings and juices are then brushed or sprayed onto the horizontally arrayed food products while they cook.

Additional advantages provided by this invention allow for feasible cooking of the shish kebob products in a fast-food operation and in a manner which is adaptable for mass production of food pre-preparation operations, such as provided by centrally preparing skewers with pre-arranged foods thereon for later suspension in a cooking oven. The invention provides an economical and reliable oven construction capable of operating at a high production rate when cooking shish kebobs. The oven is versatile and can accommodate a large range of customer demand, as the number of lit burners can be tailored with the travel speed to adjust for high volume fast cooking and low volume slow cooking of shish kebobs contained therein. By preselecting the number of burners turned on at any given time, the oven is operable economically for cooking shish kebobs over the entire travel path with a minimum of lit burners. The cooking operation is clean as it is contained within an enclosed oven chamber, and enables compliance with strict commercial food service health standards since it minimizes or eliminates direct food handling by employees operating the oven. Even unskilled personnel are able to operate the oven and practice the method of this invention utilizing the oven. Suspended skewer cooking of food products in the oven of the invention is adaptable to cooking a variety of types of foods such as chicken, beef, fish, tomatoes, mushrooms and onions, and achieves broiling of foods without smoke as food drippage is contained within an array of trays and does not burn on a heat source as in traditional broiling or similar cooking methods. Further, the invention provides for safe cooking as operators are isolated from the heat of the burner array and food drippage is contained away from and beneath the level of the burner array. Additionally, the oven is easily cleaned after completion of a cooking operation.

The oven also is well-adapted to efficiently practice the method of the invention involving a novel way of cooking shish kebobs, wherein a predetermined array of combined ingredients to be cooked are arranged and cooked selectively in a manner which either comingless juice drippage and spices between adjacent flanking pieces and non-adjacent pieces suspended there beneath, thereby providing for flavoring between each, or separates selected items from comingling of juices, whereas traditional horizontal shish kebob cooking only provides for comingling of juices between direct adjacent flanking pieces of food products.

In view of the foregoing description and drawings, as well as the objects and advantages as set forth hereinabove, it is believed that the principles of the present invention now will be well understood and that the contribution to the art set forth herein will be better appreciated. There are, of course, additional equivalent constructions that do not depart from the spirit and scope of the present invention, such as, for example, incorporation of a mechanical counter for monitoring of done-ness of food products carried on each carrier as a function of oven travel time. It is important, therefore, that the claims be regarded as including such equivalent constructions, in order to prevent appropriation of the present invention by those skilled in the art.

What is claimed is:

1. A method of cooking an array of food products removably attached to a skewer comprising the steps of:

[a] providing a variety of cookable and individually impaleable discrete food products having individually differing flavors, and selectively prearranging and impaling said products on a skewer for cooking in a predetermined array with a basting one of the products disposed above at least one of the remainder of the so impaled products when the skewer is oriented to be hung vertically;

[b] carrying said skewered food products oriented in such a vertical array on said skewer with said skewer removably suspended vertically on a conveyor operable for carrying the skewer in a horizontal travel path through a cooking oven chamber wherein the path travels adjacent a heating element array operable to cause cooking of said food products;

[c] basting the food products as they are being cooked by causing gravitational juice drippage from the basting one of the food products carried above the at least one of the remainder of suspended food products in said skewer-impaled vertical array,

[d] gravitationally collecting juice drippage from said food carrying skewer in a collection means disposed relative to the oven chamber substantially vertically beneath said travel path;

[e] detecting the cooking time of the skewer-impaled array of said food products as a predetermined function of oven cooking travel time of said food products while so suspended on the skewer and being carried on the conveyor in the oven chamber; and

[f] displaying said oven cooking travel time as a function of said skewer travel along such travel path to facilitate identifying said skewer with said food products impaled thereon and having a desired done-ness for its retrieval from suspension on the conveyor.

2. The method set forth in claim 1 further comprising, prior to the step [a], the steps of first installing a skewer-slidable food stripper on the skewer closest to an end thereof to be oriented uppermost when the skewer is vertically so suspended, then impaling said food products on the skewer to provide the prearranged array thereon, and then slidably installing a finger gripping retainer spring clip on the skewer by manually applying force to the clip for yieldably deforming a resilient spring means of the spring clip to thereby facilitate slidable engagement thereof with the skewer and then releasing such force so that the clip yieldably under spring bias force frictionally grips the skewer so as to releasably retain the array of food products thereon between the food stripper and retainer spring clip with the stripper and the retainer spring clip oriented to be respectively above and below the skewer impaled array in such skewer suspended cooking travel.

3. The method set forth in claim 1 wherein the desired juice drippage is enhanced by selecting those of such variety of food products capable of generating by cooking the most desired juice drippage and arranging such desired food products on said skewer, to be oriented during such cooking travel above the remainder of the lower skewer-suspended food products in the impaled array such that such lower arranged food products receive such drippage to baste the same.

4. Cooking apparatus for cooking food products removably attached to a skewer comprising;

[a] means including a plurality of skewers each adopted to carry food products selected to be arranged and impaled on each said skewer for cooking in a vertical array thereon,

[b] conveyor means operable for removably carrying said skewers in an endless horizontal travel path with the food products oriented in a vertical array on each said skewer,

[c] oven chamber means including heating means disposed in an array horizontally adjacent said travel path and operable to cause cooking of the food products suspended on said skewers as they travel along said travel path,

[d] means operable to detect cooking time of the array of food products on each skewer as a predetermined function of oven travel time of each of said skewer while being carried in said oven chamber means, and

[e] means for displaying the identity of said skewer to an oven attendant as a function of its oven travel time to facilitate retrieval of said identified skewer with the food products thereon having a desired done-ness.

5. The apparatus set forth in claim 4 further including food stripper means slidably received on each said skewer prior to the food products being impaled on each said skewer, and finger gripping retainer spring clip means individually removably received on each said skewer after the food products are impaled thereon to releasably retain, by spring biased frictional grip of said clip means and said skewer, the food products on each said skewer between said stripper means and said clip means.

6. The apparatus set forth in claim 4 wherein said means operable to detect cooking time of food products loaded on said skewers as a function of oven travel time comprises a plurality of skewer carrier means carried in spaced increments by said conveyor means above the food cooking travel path and having said skewers individually removably operably coupled in dependent suspended relation thereto, and means for observing the travel of said carrier means through a portion of their travel path adjacent an unloading station of said oven chamber means, and wherein said means for displaying such cooking time comprises identifier means on each of said carrier means cooperable with said observing means to establish the individual identity of each said carrier means and its associated skewer visually to an oven attendant to facilitate retrieval of food products having a desired done-ness.

7. The apparatus set forth in claim 6 wherein said carrier identifier means comprises coded visible means on each of said carrier means indicative of its sequential position on said conveyor means and positioned thereon for detection via said observing means as said carrier means individually travel sequentially therepast during cooking operation of said oven.

8. The apparatus set forth in claim 7 wherein said coded visible indicia means comprises a sequence of code marks positioned on said carrier means for optical detection display in a travel plane running past and in alignment with said observing means.

9. The apparatus set forth in claim 8 wherein said coded visible indicia means comprise a series of sequential numbers arranged in the sequence of travel of said carrier means past said observing means for detection during travel therepast.

10. The apparatus set forth in claim 7 wherein said observing means comprises a viewing window panel in said oven chamber means positioned above said oven unloading station and through which said visible indicia are observable and identifiable by the oven unloading attendant in accordance with the numbering sequence thereon.

11. The apparatus set forth in claim 7 wherein said series of sequential numbers comprise optically detectable bar coded markings carried on and individually assigned sequentially to each said carrier means, and said detecting and observing means comprises bar code reading means operable to detect, identify and display the cooking time of food products arriving on individual food loaded skewers at the unloading station.

12. The apparatus set forth in claim 10 wherein said oven chamber means includes an indexing means positioned along the travel path of said carrier means, and wherein each said carrier means includes means non-rotatably carried below said conveyor means and associated rotatable star wheel means cooperable with said indexing means and operably coupled to an associated skewer suspended on said carrier means for rotatably indexing said associated skewer about its longitudinal axis to thereby rotate the food products carried on said associated skewer during their travel in the oven food cooking path, and wherein said coded visible indicia means is located on a surface of said non-rotatable means facing the exterior of said oven chamber means and aligned with said observing means.

13. The apparatus set forth in claim 10 wherein said oven chamber means includes a plurality of abutment means positioned at equally spaced intervals along the travel path of said carrier means, and wherein each said carrier means includes bracket means non-rotatably carried below said conveyor means and rotatable star wheel means cooperable with said abutment means and operably coupled to an associated skewer suspended on said carrier means for rotatably indexing said associated skewer about its longitudinal axis as each said carrier means travels past one of said abutment means to thereby rotate the food products carried on said associated skewer during their travel in the oven food cooking path, and wherein said coded visible indicia means is located on a surface of said bracket means.

14. A cooking oven for cooking food products comprising in combination:

[a] oven cabinet means defining a single opening cooking oven chamber therein;

[b] heating element array means arranged in said oven chamber;

[c] overhead conveyor means constructed and arranged relative to said cabinet means for transporting food to be cooked in said oven chamber while hanging suspended from said conveyor means and traveling at a given constant velocity in a horizontal plane endless travel path extending along said heating element array means;

[d] food skewers removably attached and hanging vertically from said conveyor means, said skewers being directly exposed to said heating element array means through travel of said skewers in said path in a complete cycle adjacent said array;

[e] means operable to detect cooking time of the array of food products on each said skewer as a predetermined function of oven travel time of each said skewer while being carried in said oven chamber means, and

[f] means for displaying the identity of each said skewer to an oven attendant as a function of its oven travel time to facilitate retrieval of each said identified skewer with the food products thereon having a desired done-ness.

15. A method of cooking an array of food products removably attached to a skewer comprising the steps of:

[a] providing a variety of cookable and individually impaleable discrete food products having individually differing flavors, and selectively prearranging and impaling said products on a skewer for cooking in a predetermined array with a basting one of the products disposed above at least one of the remainder of the so impaled products when the skewer is oriented to be hung vertically;

[b] carrying said skewered food products oriented in said vertical array on said skewer with said skewer removably suspended vertically on a conveyor operable for carrying the skewer in a horizontal travel path through a cooking oven chamber wherein the path travels adjacent a heating element array operable to cause cooking of said food products;

[c] detecting the cooking time of the skewer-impaled array of said food products as a predetermined function of oven cooking travel time while so suspended on the skewer and being carried on the conveyor in the oven chamber; and

[d] displaying such oven cooking travel time as a function of said skewer travel along said travel path to facilitate identifying said skewer with said food product impaled thereon and having a desired done-ness for its retrieval from suspension on the conveyor.

16. The method set forth in claim 15 wherein step [b] further comprises providing a conveyor operable for carrying the skewer in an endless horizonal travel path through and disposed within the cooking oven chamber, and further comprising a step [e] of providing access to the skewered food products removably suspended on the conveyor in said travel path from the exterior of the oven chamber at first and second locations spaced diametrically opposite of one another relative to the endless travel path and adapted respectively for loading the skewed food products onto the conveyor and for unloading cooked skewed food products from the conveyor.

* * * * *